(12) United States Patent
Lee et al.

(10) Patent No.: US 12,307,953 B2
(45) Date of Patent: May 20, 2025

(54) FULL-SCREEN DISPLAY DEVICE WITH DIFFERENT UNIT PIXELS FOR EMITTING AND RECEIVING LIGHT

(71) Applicant: Guangzhou Tyrafos Semiconductor Technologies Co., Ltd., Guangzhou (CN)

(72) Inventors: Chun-Yu Lee, New Taipei (TW); Jun-Wen Chung, Tainan (TW)

(73) Assignee: Guangzhou Tyrafos Semiconductor Technologies Co., Ltd., Guangzhou (CN)

( * ) Notice: Subject to any disclaimer, the term of this patent is extended or adjusted under 35 U.S.C. 154(b) by 0 days.

(21) Appl. No.: 18/494,558

(22) Filed: Oct. 25, 2023

(65) Prior Publication Data

US 2024/0194128 A1    Jun. 13, 2024

Related U.S. Application Data

(60) Provisional application No. 63/431,332, filed on Dec. 9, 2022.

(51) Int. Cl.
| | |
|---|---|
| *G06V 40/13* | (2022.01) |
| *G06F 21/32* | (2013.01) |
| *G09G 3/32* | (2016.01) |
| *H10K 59/65* | (2023.01) |
| *H10K 59/80* | (2023.01) |

(52) U.S. Cl.
CPC ............... *G09G 3/32* (2013.01); *G06F 21/32* (2013.01); *G06V 40/1318* (2022.01); *H10K 59/65* (2023.02); *H10K 59/877* (2023.02); *H10K 59/879* (2023.02); *H10K 59/873* (2023.02)

(58) Field of Classification Search
CPC ...... G09G 3/32; G06V 40/1318; H10K 59/65; H10K 59/879; H10K 59/877; H10K 59/873; G06F 21/32
See application file for complete search history.

(56) References Cited

U.S. PATENT DOCUMENTS

2017/0337413 A1* 11/2017 Bhat ................... G06V 40/1347
2020/0083302 A1* 3/2020 Park ....................... H10K 59/60

FOREIGN PATENT DOCUMENTS

| JP | H06325158 A | * | 11/1994 | ......... G06V 40/1318 |
| WO | WO-2020030130 A1 | * | 2/2020 | ......... G06V 40/1318 |
| WO | WO-2022141454 A1 | * | 7/2022 | ......... G02F 1/13338 |

* cited by examiner

*Primary Examiner* — Stephen G Sherman

(57) ABSTRACT

A full-screen display device has different unit pixels for emitting and receiving light, including a water-oxygen barrier layer, a protective panel, a plurality of unit pixels, a light-shielding layer, and a plurality of lenses. When the device performs biometric recognition, at least one unit pixel is defined as a light-emitting element, at least one unit pixel is defined as a sensing element, and the sensing element has a light-sensing area. The light-emitting element emits an incident light to penetrate the water-oxygen barrier layer and scatter outwardly by at least one lens. The scattered incident light penetrates the protective panel, and is then reflected by a test object, followed by penetrating the protective panel, and entering at least one lens, which converges the reflected light. The converged light penetrates the water-oxygen barrier layer to be received by the light-sensing area and converted into an image electrical signal.

7 Claims, 7 Drawing Sheets

FULL-SCREEN DISPLAY DEVICE WITH DIFFERENT UNIT PIXELS FOR EMITTING AND RECEIVING LIGHT

CROSS-REFERENCE TO RELATED APPLICATION

This application claims priority of U.S. provisional application No. 63/431,332, filed on Dec. 9, 2022, the content of which is incorporated herein in its entirety by reference.

BACKGROUND OF THE INVENTION

1. Field of the Invention

The present invention relates generally to a full-screen display device, and more particularly, to a full-screen display device with different unit pixels for emitting and receiving light.

2. The Prior Arts

With the innovation of mobile phone technology and the demands of continuous improvement from mobile phone users, to achieve a better user experience, the display screen of smart phones has developed towards a full-screen design. In order to provide unlocking recognition, under-screen optical fingerprint or palmprint recognition is a common solution currently on the market. Not only in the application field of smartphones, but also in building security system and corporate attendance system based on optical fingerprint or palmprint recognition system.

Current under-screen optical fingerprint or palmprint recognition is mainly lens-based. The optical lens module is placed under the organic light-emitting diode (OLED) screen to detect changes in fingerprints or palmprints pressed on the screen.

However, lens-based under-screen optical fingerprint or palmprint recognition must be placed below the display screen to sense the light reflected from the fingers or palms through the light-transmitting gaps between pixels. With the evolution of organic light-emitting diodes, the increase in screen resolution has led to a decrease in screen transmittance and the development trend of large-scale fingerprint or palmprint recognition. The conventional lens-based under-screen optical fingerprint or palmprint recognition is often considered no longer possible to meet needs.

SUMMARY OF THE INVENTION

A primary objective of the present invention is to provide a full-screen display device with different unit pixels for receiving and transmitting light, which can provide half-screen or full-screen large-area optical biometric recognition technology to realize the full-screen biometric pressing function.

Another objective of the present invention is to provide a full-screen display device in which different unit pixels emit and receive light, so as to improve the signal-to-noise ratio (SNR).

In order to achieve the aforementioned objectives, the present invention provides a full-screen display device with different unit pixels emitting and receiving light, including a water and oxygen barrier layer; a protective panel, is disposed above the water and oxygen barrier layer; a plurality of unit pixels, arranged below the water and oxygen barrier layer; a light-shielding layer, disposed on a first surface of the water and oxygen barrier layer and having a plurality of openings to expose at least part of each of the unit pixels; and a plurality of lenses, disposed on the first surface of the water-oxygen barrier layer and located in the openings; wherein, when the full-screen display device performs biometric recognition, at least one of the unit pixels is defined as a light-emitting element, at least one of the unit pixels is defined as a sensing element, and the sensing element has a light-sensing area; wherein, the unit pixel defined as the light-emitting element emits an incident light, the incident light passing through the water and oxygen barrier layer and scattering outwardly through at least one of the lenses, and the scattered incident light passing through the protective panel and then reflected by a test object to generate a reflected light; the reflected light passing through the protective panel, entering at least one of the lenses and being converged; and the converged reflected light travels along a converged light path and passes through the water and oxygen barrier layer to be received by the light-sensing area and converted into an image electrical signal.

In a preferred embodiment, each lens is a microlens or a meta-lens.

In a preferred embodiment, a size of the light-sensing area is obtained through the following conditions: (1) the curved surface of the microlens is a spherical surface, an aspherical surface or an asymmetric free-form surface, or the meta-lens comprises a nanometer microstructure;

$$\left(\frac{B}{A}\right) \times 0.001 \text{ mm} < D < \left(\frac{A}{B}\right) \times 1000 \text{ mm}; \quad (2)$$

$$\left(\frac{B}{3.5 \times A}\right) \times 0.001 \text{ mm} < H < \left(\frac{7.0 \times A}{B}\right) \times 10 \text{ mm}; \quad (3)$$

$$0.00005 < \frac{B}{A} < 0.99995; \quad (4)$$

$$\left(\frac{B}{A}\right) \times 0.001 \div \sqrt{2} \text{ mm} < R < \left(\frac{A}{B}\right) \times 1000 \text{ m}; \quad (5)$$

$$\text{and } Z2 \leq Z1; \quad (6)$$

where A is the size of a unit pixel, B is the size of the light-sensing area, D is the thickness of the water and oxygen barrier layer, H is the height of each microlens, R is the curvature of each microlens, and Z1 is the diameter of each microlens, and Z2 is a diameter of each opening.

In a preferred embodiment, the full-screen display device further includes a light-absorbing layer disposed between the unit pixel defined as the sensing element and the water-oxygen barrier layer, and the light-absorbing layer defines a through hole, the light-sensing area is located below the through hole, and the light-absorbing layer does not absorb the emission wavelength defined by the unit pixel of the sensing element.

In a preferred embodiment, the through hole is disposed on a converged light path of one of the lenses and is located at the center of the light-absorbing layer, and the light-sensing area is located at the center of the unit pixel defined as the sensing element.

In a preferred embodiment, each lens is a microlens or a meta-lens, and a size of the light-sensing area is obtained through the following conditions: (1) the curved surface of the microlens is a spherical surface, an aspherical surface or an asymmetric free-form surface, or the meta-lens comprises a nanometer microstructure;

$$\left(\frac{B}{A}\right) \times 0.001 \text{ mm} < D < \left(\frac{A}{B}\right) \times 1000 \text{ mm}; \qquad (2)$$

$$\left(\frac{B}{3.5 \times A)}\right) \times 0.001 \text{ mm} < H < \left(\frac{7.0 \times A}{B}\right) \times 10 \text{ mm}; \qquad (3)$$

$$0.00005 < \frac{B}{A} < 0.99995; \qquad (4)$$

$$\left(\frac{B}{A}\right) \times 0.001 \div \sqrt{2} \text{ mm} < R < \left(\frac{A}{B}\right) \times 1000 \text{ m}; \qquad (5)$$

$$\text{and } Z2 \leq Z1; \qquad (6)$$

where A is the size of a unit pixel, B is the size of the light-sensing area and the diameter of the through hole, D is the thickness of the water and oxygen barrier layer, H is the height of each microlens, R is the curvature of each microlens, and Z1 is the diameter of each microlens, and Z2 is a diameter of each opening.

In a preferred embodiment, the unit pixels include a plurality of red light unit pixels, a plurality of blue light unit pixels, and a plurality of green light unit pixels; wherein, when the full-screen display device performs biometric recognition, the pixels defined as the light-emitting elements are the blue light unit pixels, the unit pixels defined as the sensing element are the red light unit pixels, and the green light unit pixels are defined as inactive unit pixels.

In a preferred embodiment, the unit pixels include a plurality of red light unit pixels, a plurality of blue light unit pixels, and a plurality of green light unit pixels; wherein, when the full-screen display device performs biometric recognition, the pixels defined as the light-emitting elements are the blue light unit pixels, the unit pixels defined as the sensing element are the green light unit pixels, and the red light unit pixels are defined as inactive unit pixels.

In a preferred embodiment, the unit pixels include a plurality of red light unit pixels, a plurality of blue light unit pixels, and a plurality of green light unit pixels; wherein, when the full-screen display device performs biometric recognition, the pixels defined as the light-emitting elements are the green light unit pixels, the unit pixels defined as the sensing element are the red light unit pixels, and the blue light unit pixels are defined as inactive unit pixels.

In a preferred embodiment, the full-screen display device further includes an organic light-emitting diode, disposed on or below a second surface of the water-oxygen barrier layer and including the plurality of unit pixels.

The effect of the present invention is that the full-screen display device of the present invention can converge reflected light to the light-sensing area through the lenses, and at the same time, the unit pixel defined as the sensing element does not emit light, so that the difference in size of the light-sensing area can block biometric characteristics crosstalk to obtain clear biometric images. Thereby, the full-screen display device of the present invention can provide half-screen or full-screen large-area optical biometric recognition technology to realize the full-screen biometric pressing function.

Furthermore, when the full-screen display device of the present invention performs biometric recognition, except for the emission wavelength of the sensing element, the wavelength of the external scattered light and the light wavelength of the light-emitting element will be absorbed by the light-absorbing layer, reducing external scattered light and the crosstalk of light reflection and diffusion of the light-emitting elements. Therefore, only the converged reflected light will pass through the through hole of the light-absorbing layer along the converged light path of the lens to be focused on the light-sensing area, thereby improving the signal-to-noise ratio (SNR).

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
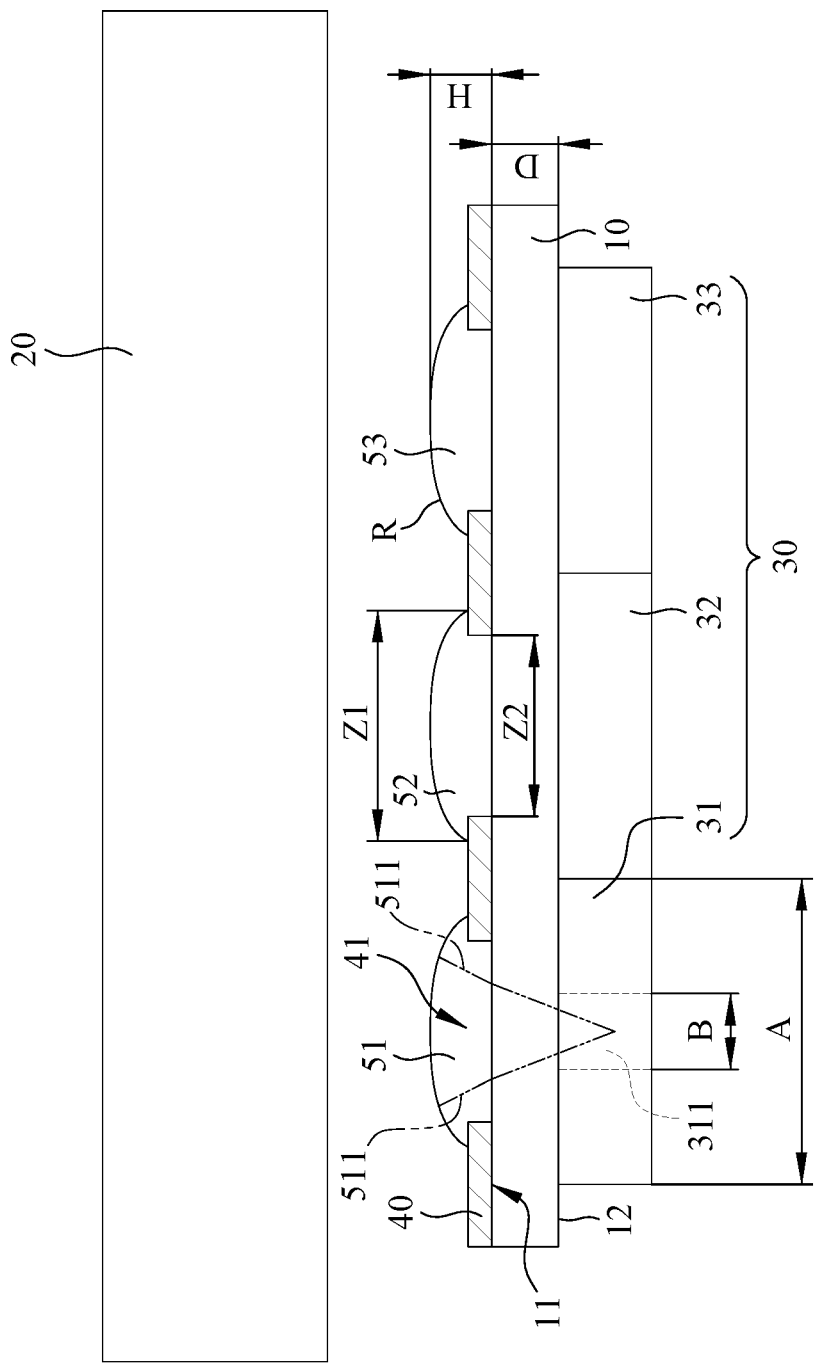
FIG. 1 is a schematic structural diagram of the first embodiment of the present invention.

FIG. 1 is a schematic structural diagram of the first embodiment of the present invention. As shown in FIG. 1, the present invention provides a full-screen display device with different unit pixels for transmitting and receiving light, including a water and oxygen barrier layer 10, a protective panel 20, a plurality of unit pixels 31, 32, 33, and a light-shielding layer 40, and a plurality of lenses 51, 52, 53. The protective panel 20 is disposed above the water and oxygen barrier layer 10. The unit pixels 31, 32, 33 are disposed below the water and oxygen barrier layer 10. The light-shielding layer 40 is disposed on a first surface 11 of the water and oxygen barrier layer 10 and has a plurality of openings 41 that expose at least part of each of the unit pixels 31, 32, 33. The lenses 51, 52, 53 are disposed on the first surface 11 of the water-oxygen barrier layer 10 and located in the openings 41.

When the full-screen display device of the present invention is used as a display screen, the unit pixels 31, 32, 33 emit incident light, which passes through the water and oxygen barrier layer 10 and scatters outwardly through the lenses 51, 52, 53, the scattered incident light passes through the protective panel 20 and emits outwardly, achieving the effect of full-screen display.

Figure 2:
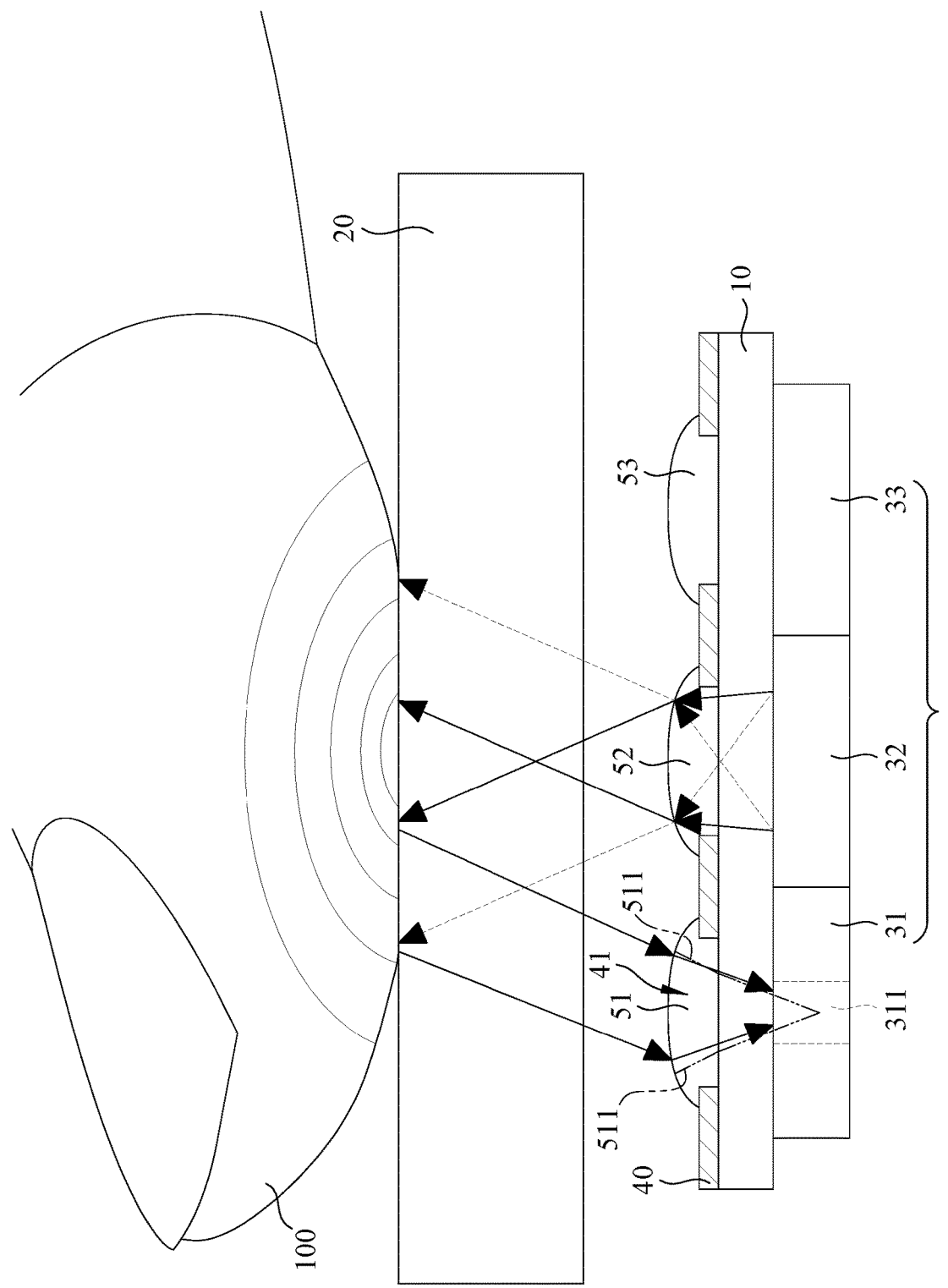
FIG. 2 is a schematic diagram of biometric recognition according to the first embodiment of the present invention.

FIG. 2 is a schematic diagram of biometric recognition according to the first embodiment of the present invention. As shown in FIG. 2, when the full-screen display device of the present invention performs biometric recognition, the unit pixel 32 is defined as a light-emitting element, the unit pixel 31 is defined as a sensing element, and the unit pixel 31 defined as a sensing element has a light-sensing area 311. The unit pixel 32 defined as a light-emitting element emits an incident light. The incident light passes through the water and oxygen barrier layer 10 and is scattered outwardly through the lens 52. The outwardly scattered incident light passes through the protective panel 20 and is reflected by an object 100. To generate a reflected light, the reflected light passes through the protective panel 20 and then enters the lens 51. The lens 51 converges the reflected light. The converged reflected light passes through the water and oxygen barrier layer 10 along a converged light path 511 of the lens 51 and then passes through the light-sensing area 311 to be received and converted into an image electrical signal.

The object 100 shown in FIG. 2 is a finger, so the biometric feature is a fingerprint. In a preferred embodiment, the object 100 can also be a palm, and thus the biometric feature can be veins or palm prints.

The light-shielding layer 40 can shield external scattered light, and the light-shielding layer 40 can be formed of any material that can shield light. For example, the light-shielding material may include a light-absorbing material, but is not limited thereto. For example, the material of the light-shielding layer 40 may include black ink or black photoresist. In addition, the light-shielding layer 40 may be formed on the surface by printing. However, the material, color and method of forming the light-shielding layer 40 on the surface can be modified according to applications and are not limited to the above.

As shown in FIG. 1, in the first embodiment, each lens 51, 52, 53 is a micro lens. In a preferred embodiment, each lens 51, 52, 53 may also be a meta-lens. Both microlenses and meta-lenses provide the functions of scattering the incident light outwardly and converging the reflected light. The operation principles are well-known common knowledge, and will not be described in detail herein.

As shown in FIG. 1, the size of the light-sensing area 311 is obtained through the following conditions: (1) the curved surface of the microlens is a spherical surface, an aspherical surface or an asymmetric free-form surface (not shown in the figure), or the meta-lens comprises a nanometer microstructure;

$$\left(\frac{B}{A}\right) \times 0.001 \text{ mm} < D < \left(\frac{A}{B}\right) \times 1000 \text{ mm}; \quad (2)$$

$$\left(\frac{B}{3.5 \times A}\right) \times 0.001 \text{ mm} < H < \left(\frac{7.0 \times A}{B}\right) \times 10 \text{ mm}; \quad (3)$$

$$0.00005 < \frac{B}{A} < 0.99995; \quad (4)$$

$$\left(\frac{B}{A}\right) \times 0.001 \div \sqrt{2} \text{ mm} < R < \left(\frac{A}{B}\right) \times 1000 \text{ m}; \quad (5)$$

and $Z2 \le Z1$; (6)

where A is the size of a unit pixel, B is the size of the light-sensing area 311, D is the thickness of the water and oxygen barrier layer 10, H is the height of each microlens, R is the curvature of each microlens, and Z1 is the diameter of each microlens, and Z2 is a diameter of each opening 41. Through the above conditions, the light-sensing area 311 has a smaller size.

More specifically, the size of the light-sensing area 311 has a great impact on the occurrence of cross talk. In principle, the smaller the size of the light-sensing area 311 (for example, the size of the light-sensing area 311 is smaller than ¹⁄₁₀ of the size of the unit pixel), the smaller the impact of crosstalk. With the lens 51 to converge the reflected light in the light-sensing area 311, the light energy of the unit pixel 32 defined as the light-emitting element will not be decreased by the small size of the light-sensing area 311, but instead can achieve a better effect of blocking crosstalk. What is important is that the smaller the size of the light-sensing area 311 is, the less it will affect the color and viewing angle of the unit pixel 31 defined as a sensing element under normal display.

As shown in FIG. 1, in the first embodiment, the full-screen display device of the present invention further includes an organic light-emitting diode 30. The organic light-emitting diode 30 is disposed on a second surface 12 of the water and oxygen barrier layer 10. The second surface 12 also includes the unit pixels 31, 32, 33.

Figure 3:
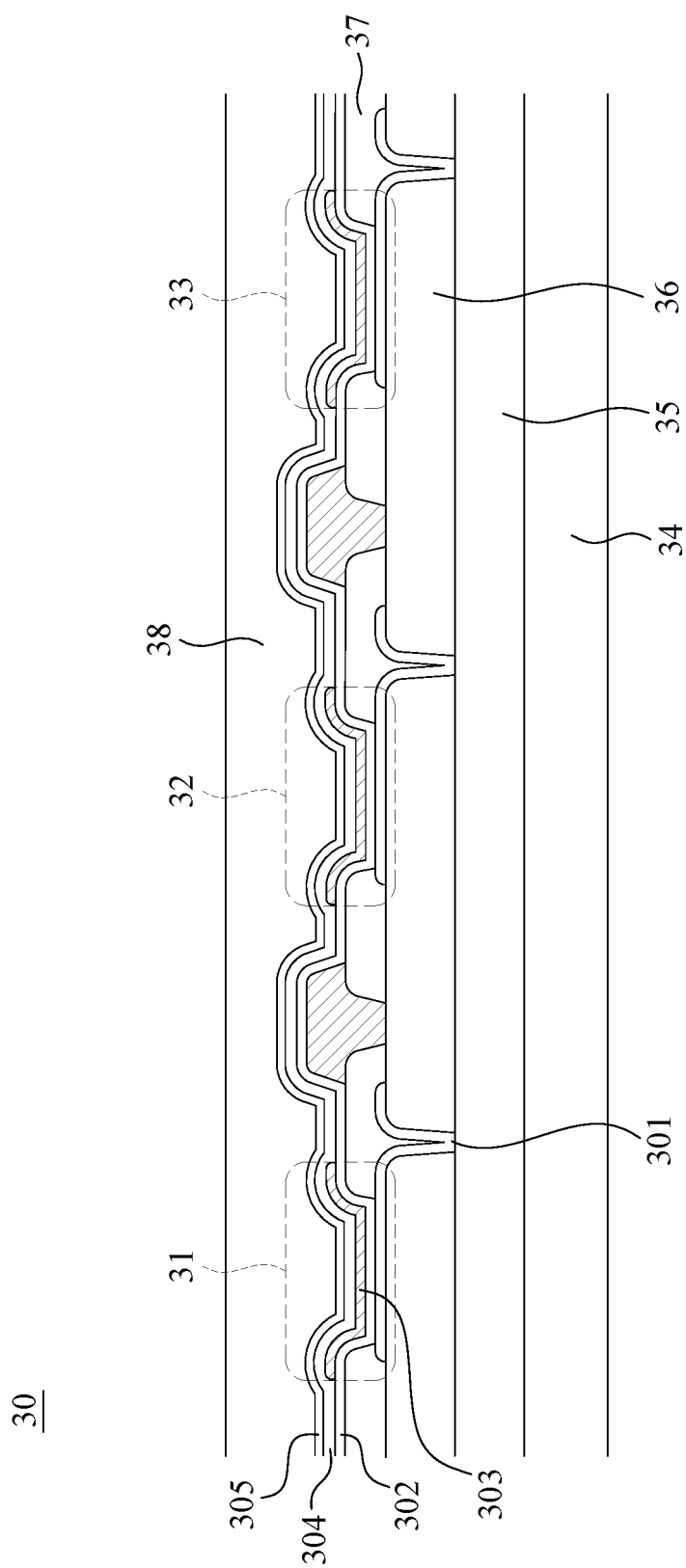
FIG. 3 is a cross-sectional view of the organic light-emitting diode according to the first embodiment of the present invention.

FIG. 3 is a cross-sectional view of the organic light emitting diode 30 according to the first embodiment of the present invention. As shown in FIG. 3, in the first embodiment, the organic light emitting diode 30 further includes a substrate 34, a pixel circuit 35, a planarization dielectric layer 36, a barrier bank 37, and an encapsulation layer 38, and each unit pixel 31, 32, 33 includes an anode 301, a hole transport layer 302, a light-emitting layer 303, an electron transport layer 304, and a cathode 305. The substrate 34 is, for example, but not limited to, a glass substrate, a polyethylene terephthalate (PET) substrate, an olefin polymer (COP) substrate, a transparent polyimide (CPI) substrate, a polyethylene naphthalate (PEN) substrate. substrate, a polycarbonate (PC) substrate, a polyether styrene (PES) substrate, or polarizing film. The pixel circuit 35 is disposed on the substrate 34, coupled to the unit pixel 31, 32, 33, and used to control the unit pixel 31, 32, 33. The planarization dielectric layer 36 is disposed between the bottoms of the unit pixels 31, 32, 33 and the pixel circuit 35. There is a barrier bank 37 on the planarized dielectric layer 36 that is previously produced by a lithographic etching process, and the anodes 301 of the unit pixels 31, 32, 33 are connected to the corresponding pixel circuit 35 through a guide hole between the barrier banks 37. The encapsulation layer 38 is disposed on top of the unit pixels 31, 32, 33. The encapsulation layer 38 may be a single layer of inorganic encapsulation material, a multi-layer stack of inorganic encapsulation materials or paired stack of inorganic encapsulation materials and organic encapsulation materials. Inorganic encapsulation materials include, but are not limited to, silicon nitride (SiNx), silicon oxide (SiOx), silicon oxynitride (SiONx), aluminum oxide (AlOx) or titanium oxide (TiOx).

In the first embodiment, the unit pixels 31, 32, 33 include a plurality of red light unit pixels, a plurality of blue light unit pixels, and a plurality of green light unit pixels. When the full-screen display device of the present invention is used as a display screen, the red unit pixels emit red incident light (wavelength between 620 nm and 750 nm), and the blue unit pixels emit blue incident light (wavelength between 430 nm and 495 nm), these green light unit pixels emit green incident light (wavelength between 495 nm and 570 nm). The incident red light, the incident blue light, and the incident green light pass through the water and oxygen barrier layer 10 and are scattered outwardly through the lenses 51, 52, 53 respectively. The incident light passes through the protective panel 20 and is emitted outwardly, achieving the effect of full-screen display.

As shown in FIG. 2, in the first embodiment, when the full-screen display device of the present invention performs biometric recognition, the unit pixels 32 defined as the light-emitting elements are the blue light unit pixels, and the unit pixels 31 defined as the sensing elements are the red light unit pixels, and the inactive unit pixels 33 are the green light unit pixels (that is, in a closed state, neither emitting incident light nor receiving reflected light).

Figure 4:
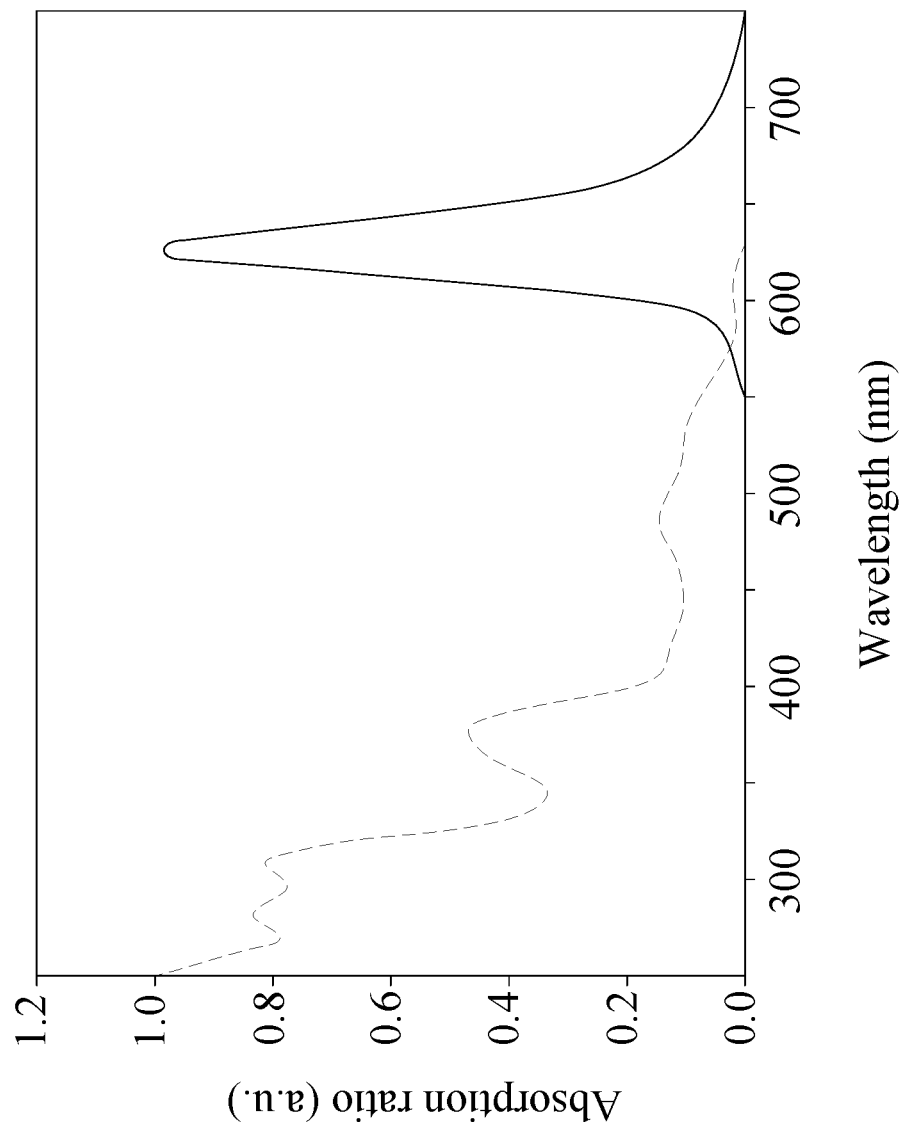
FIG. 4 is a diagram showing the absorption spectrum and emission spectrum of the main material of the organic light-emitting diode.

FIG. 4 is a diagram of the absorption spectrum and emission spectrum of the main material of the organic light-emitting diode 30. As shown in FIG. 4, a general organic light-emitting diode 30 uses fluorescent materials or phosphorescent materials as the main material of the light-emitting layer. When the characteristics of the main material are that the molecules inside the material absorb radiation energy higher than their own energy, the electrons are excited from the ground state to the excited state with higher energy, and then the electrons decay from the excited state to the ground state to produce light.

It can be understood that, according to the above-mentioned absorption spectrum and emission spectrum, in the first embodiment, the reason why the unit pixel 32 defined as the light-emitting element is the blue light unit pixel is that the unit pixels 31 defined as the sensing element are red light unit pixels, and it is ensured that the molecules inside the main material of the light-sensing area 311 of the red light unit pixels absorb radiant energy higher than their own energy, thereby generating corresponding image electrical signals. However, the present invention is not limited to thereto.

In a preferred embodiment, when the full-screen display device of the present invention performs biometric recognition, the unit pixel 32 defined as the light-emitting element is the blue light unit pixel, and the unit pixel 31 defined as the sensing element is the green light unit pixel, and the inactive unit pixel 33 is the red light unit pixel. It can be understood that, according to the above-mentioned absorption spectrum and emission spectrum, in the present embodiment, the reason why the unit pixel 32 defined as the light-emitting element is the blue light unit pixel is because the unit pixel 31 defined as the sensing element is the green light unit pixels, and ensures that the molecules inside the main material of the light-sensing area 311 of the green light unit pixels absorb radiant energy higher than their own energy, thereby generating corresponding image electrical signals. However, the invention is not limited thereto.

In a preferred embodiment, when the full-screen display device of the present invention performs biometric recognition, the unit pixel 32 defined as the light-emitting element is the green light unit pixel, and the unit pixel 31 defined as the sensing element is the red light unit pixels, and the inactive unit pixel 33 is the blue light unit pixels. It can be understood that, according to the above-mentioned absorption spectrum and emission spectrum, in the present embodiment, the reason why the unit pixel 32 defined as the light-emitting element is the green light unit pixel is because the unit pixel 31 defined as the sensing element is the red light unit pixels, and ensures that the molecules inside the main material of the light-sensing area 311 of these red light unit pixels absorb radiant energy higher than their own energy, thereby generating corresponding image electrical signals. However, the present invention is not limited to thereto.

Figure 5:
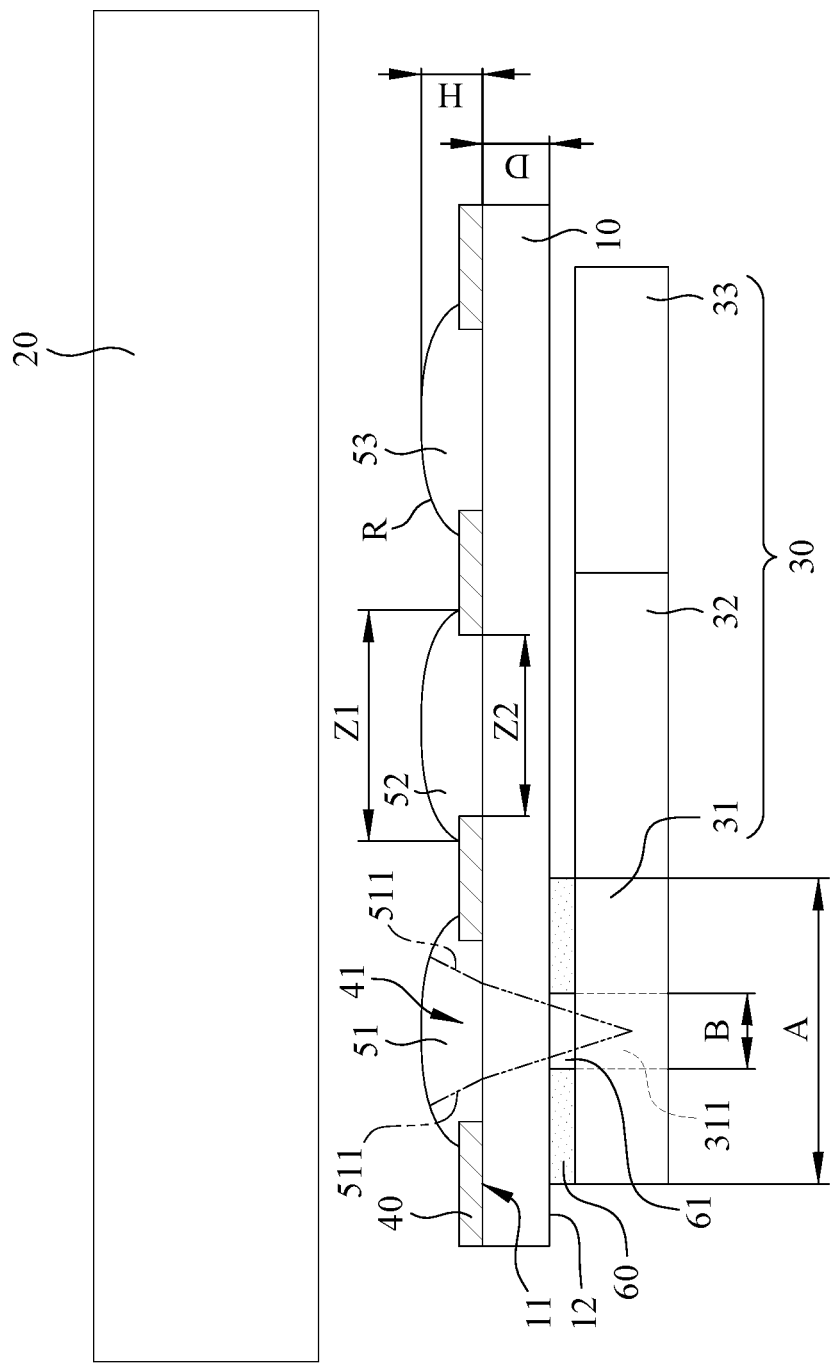
FIG. 5 is a schematic structural diagram of the second embodiment of the present invention.
Figure 6:
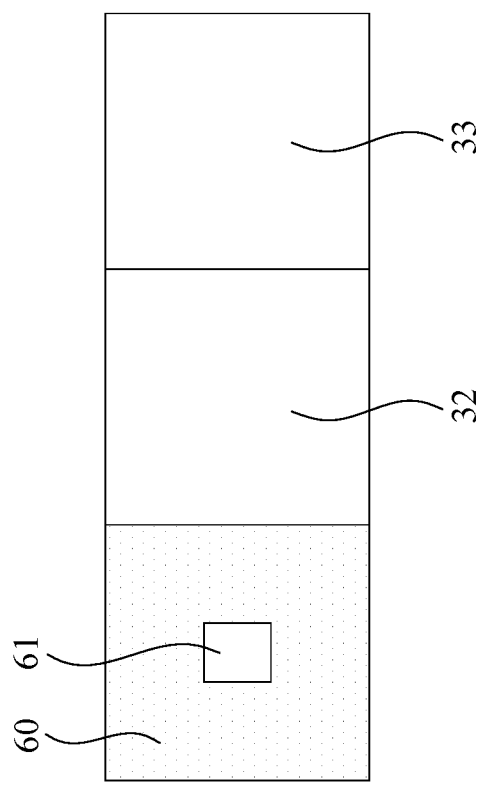
FIG. 6 is a top view of an organic light-emitting diode according to the second embodiment of the present invention.

FIG. 5 is a schematic structural diagram of the second embodiment of the present invention, and FIG. 6 is a top view of the organic light-emitting diode 30 of the second embodiment of the present invention. As shown in FIG. 5 and FIG. 6, the structural differences between the second embodiment and the first embodiment are: first, the organic light-emitting diode 30 is disposed below the water and oxygen barrier layer 10; second, the full-screen display device of the present invention further includes a light-absorption layer 60. The light-absorption layer 60 is disposed between the unit pixel 31 defined as a sensing element and the water and oxygen barrier layer 10. The light-absorption layer 60 defines a through hole 61, and the through hole 61 is disposed at the center of the light-absorption layer 60 on a converged light path 511 of the lens 51; third, the light-sensing area 311 is located at the center of the unit pixel 31 defined as the sensing element and is located below the through hole 61; and fourth, the light-absorption layer 60 does not absorb the emission wavelength of the unit pixel 31 defined as the sensing element.

When the full-screen display device of the present invention is defined as a display screen, the emission wavelength of the unit pixel 31 can pass through the light-absorption layer 60. Therefore, the light-absorption layer 60 will not affect the full-screen display effect of the full-screen display device of the present invention.

Figure 7:
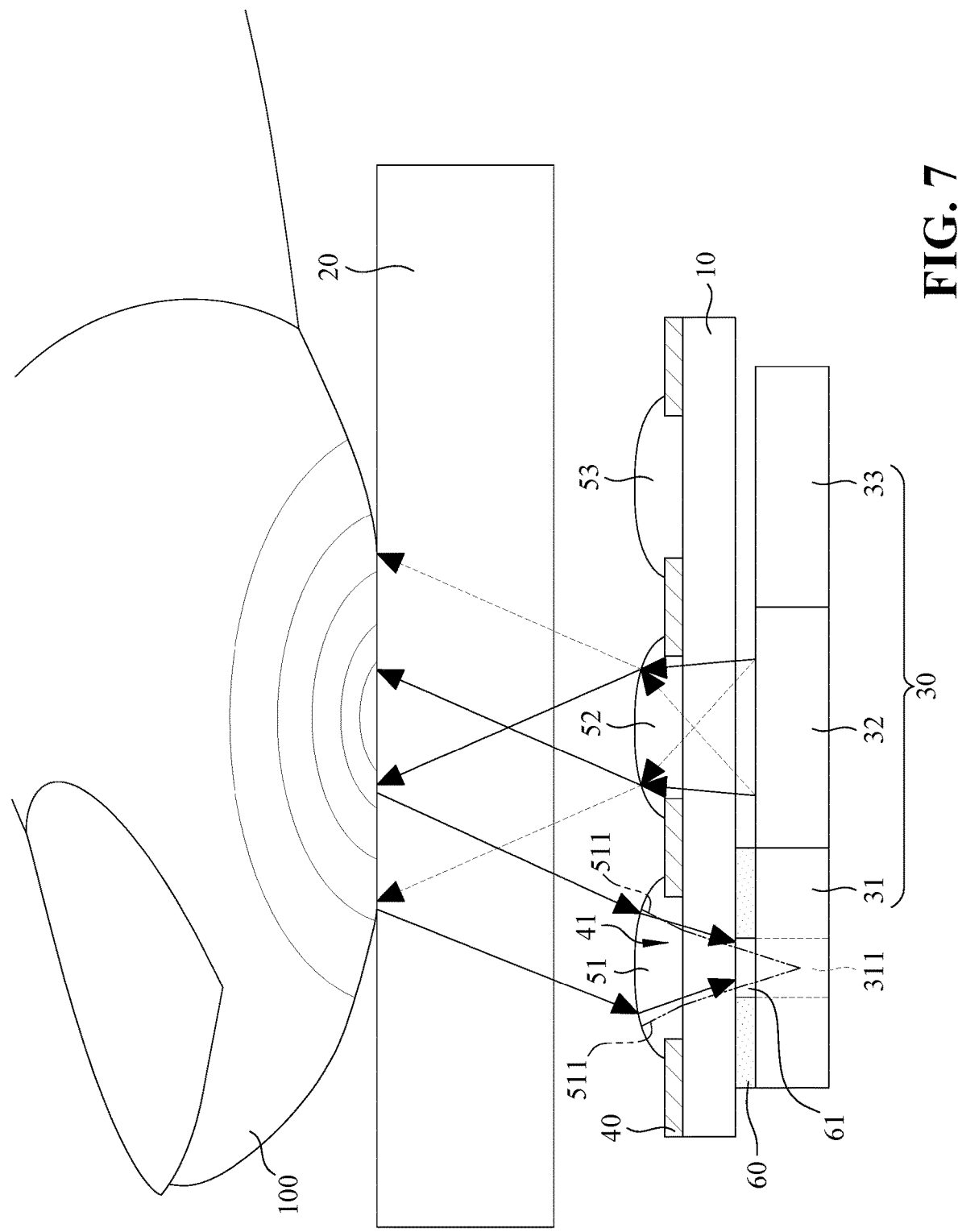
FIG. 7 is a schematic diagram of biometric recognition according to the second embodiment of the present invention.

FIG. 7 is a schematic diagram of biometric recognition according to the second embodiment of the present invention. As shown in FIG. 7, when the full-screen display device of the present invention performs biometric recognition, except for the emission wavelength of the unit pixel 31 defined as the sensing element, the wavelength of the scattered ambient light and the light wavelength of the unit pixel 32 defined as the light-emitting element will be absorbed by the light-absorption layer 60, thereby reducing external scattered ambient light and crosstalk of light reflection and diffusion of the unit pixel 32 defined as a light-emitting element. Therefore, only the converged reflected light will be converged on the light-sensing area 311 along the converged light path 511 of the lens 51 through the through hole 61 of the light-absorption layer 60, thereby improving the signal-to-noise ratio (SNR).

As shown in FIG. 5, the size of the light-sensing area 311 and the diameter of the through hole 61 are obtained through the following conditions: (1) the curved surface of the microlens is a spherical surface, an aspherical surface or an asymmetric free-form surface, or the meta-lens comprises a nanometer microstructure;

$$\left(\frac{B}{A}\right) \times 0.001 \text{ mm} < D < \left(\frac{A}{B}\right) \times 1000 \text{ mm}; \tag{2}$$

$$\left(\frac{B}{3.5 \times A}\right) \times 0.001 \text{ mm} < H < \left(\frac{7.0 \times A}{B}\right) \times 10 \text{ mm}; \tag{3}$$

$$0.00005 < \frac{B}{A} < 0.99995; \tag{4}$$

$$\left(\frac{B}{A}\right) \times 0.001 \div \sqrt{2} \text{ mm} < R < \left(\frac{A}{B}\right) \times 1000 \text{ m}; \tag{5}$$

$$\text{and } Z2 \leq Z1; \tag{6}$$

where A is the size of a unit pixel, B is the size of the light-sensing area 311 and the diameter of the through hole, D is the thickness of the water and oxygen barrier layer 10, H is the height of each microlens, R is the curvature of each microlens, and Z1 is the diameter of each microlens, and Z2 is a diameter of each opening 41. Through the above conditions, the light-sensing area 311 has a smaller size, the through hole 61 has a smaller diameter, and the size of the light-sensing area 311 is equal to the diameter of the through hole 61.

More specifically, the size of the light-sensing area 311 and the diameter size of the through hole 61 have a great impact on the occurrence of cross talk. In principle, the smaller the size of the light-sensing area 311 and the smaller the diameter of the through hole 61, (for example, the size of the light-sensing area 311 and the diameter of the through hole 61 are both smaller than 1/10 of the size of the unit pixel 31 defined as the sensing element), the smaller the impact of crosstalk. the smaller the impact of crosstalk. With the lens 51 to converge the reflected light in the light-sensing area 311, the light energy of the unit pixel 32 defined as the light-emitting element will not be decreased by the small size of the light-sensing area 311 and the small diameter of the through hole 61, but instead can achieve a better effect of blocking crosstalk. What is important is that the smaller the size of the light-sensing area 311 and the diameter of the through hole 61 are, the less it will affect the color and viewing angle of the unit pixel 31 defined as a sensing element under normal display.

As shown in FIG. 5, in the second embodiment, the light-absorption layer 60 is substantially disposed between the unit pixel 31 defined as a sensing element and the water and oxygen barrier layer 10, and the light-absorption layer 60 does not absorb the emission wavelength of the unit pixel 31 defined as a sensing element. In other words, the emission wavelength defined as the unit pixel 31 of the sensing element can pass through the light-absorption layer 60.

As shown in FIG. 7, in the second embodiment, when the full-screen display device of the present invention performs biometric recognition, the unit pixels 32 defined as the light-emitting elements are blue light unit pixels, and the unit pixels 312 defined as the sensing elements are 31 are the red light unit pixels, and the inactive unit pixels 33 are the green light unit pixels (that is, in a closed state, neither emitting incident light nor receiving reflected light). Therefore, the wavelength of external scattered ambient light and the blue light wavelength will be absorbed by the light-absorption layer 60, thereby reducing the reflection and diffusion crosstalk of the external scattered ambient light and blue light wavelength. Furthermore, the light-absorption layer 60 does not absorb red light wavelengths, so the red light wavelengths can pass through the light-absorption layer 60.

In a preferred embodiment, when the full-screen display device of the present invention performs biometric recognition, the unit pixels 32 defined as the light-emitting element are the blue light unit pixels, and the unit pixels 31 defined as the sensing element are the green light unit pixels, the inactive unit pixels 33 are the red light unit pixels. Therefore, the wavelength of external scattered ambient light and the blue light wavelength will be absorbed by the light-absorption layer 60, thereby reducing the reflection and diffusion crosstalk of the external scattered ambient light and blue light wavelength. Furthermore, the light-absorption layer 60 does not absorb the green light wavelength, so the green light wavelength can pass through the light-absorption layer 60.

In a preferred embodiment, when the full-screen display device of the present invention performs biometric recognition, the unit pixels 32 defined as the light-emitting element are the green light unit pixel, and the unit pixels 31 defined as the sensing element are the red light unit pixels, and the inactive unit pixels 33 are the blue light unit pixel. Therefore, the wavelength of external scattered ambient light and the green light wavelength will be absorbed by the light-absorption layer 60, thereby reducing the reflection and diffusion crosstalk of the external scattered ambient light and green light wavelength. Furthermore, the light-absorption layer 60 does not absorb red light wavelengths, so the red light wavelengths can pass through the light-absorption layer 60.

As shown in FIGS. 5 and 6, preferably, the through hole 61 is located at the center of the light-absorption layer 60, and the light-sensing area 311 is located at the center of the unit pixel 31 defined as a sensing element and below the through hole 61. More specifically, the position of the through hole 61 is exactly on the projection path of the converged reflected light, so that the converged reflected light can be converged on the light-sensing area 31.

Preferably, the material of the light-absorption layer 60 can be organic dye or pigment.

In summary, the full-screen display device of the present invention can converge the reflected light to the light-sensing area 311 through the lens 51, and at the same time, the unit pixel 31 defined as the sensing element does not emit light, so that the size difference of the light-sensing area 311 can block the crosstalk of biometric features, thereby obtaining clear biometric images. Therefore, the full-screen display device of the present invention can provide half-screen or full-screen large-area optical biometric recognition technology to realize the full-screen biometric pressing function.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A full-screen display device with different unit pixels for emitting and receiving light, comprising:
a water and oxygen barrier layer;
a protective panel, disposed above the water and oxygen barrier layer;
a plurality of unit pixels, arranged below the water and oxygen barrier layer, at least one of the unit pixels being defined as a light-emitting element and at least one of the unit pixels being defined as a sensing element when the full-screen display device performs biometric recognition, and the sensing element having a light-sensing area;
a light-shielding layer, disposed on a first surface of the water and oxygen barrier layer and having a plurality of openings to expose at least part of each of the unit pixels; and
a plurality of lenses, disposed on the first surface of the water and oxygen barrier layer and located in the openings;
wherein each of the lenses is a microlens or a meta-lens and a size of the light-sensing area is obtained through the following conditions: (1) a curved surface of the microlens is a spherical surface, an aspherical surface or an asymmetric free-form surface, or the meta-lens comprises a nanometer microstructure;

$$\left(\frac{B}{A}\right) \times 0.001 \text{ mm} < D < \left(\frac{A}{B}\right) \times 1000 \text{ mm}; \qquad (2)$$

$$\left(\frac{B}{3.5 \times A}\right) \times 0.001 \text{ mm} < H < \left(\frac{7.0 \times A}{B}\right) \times 10 \text{ mm}; \qquad (3)$$

$$0.00005 < \frac{B}{A} < 0.99995; \qquad (4)$$

-continued $$\left(\frac{B}{A}\right) \times 0.001 \div \sqrt{2} \text{ mm} < R < \left(\frac{A}{B}\right) \times 1000 \text{ m};$$  (5)

and $Z2 \leq Z1$;  (6)

where A is a size of a unit pixel, B is the size of the light-sensing area, D is a thickness of the water and oxygen barrier layer, H is a height of the microlens, R is a curvature of the microlens, and Z1 is a diameter of the microlens, and Z2 is a diameter of each of the openings; and wherein the unit pixel defined as the light-emitting element emits an incident light, the incident light passing through the water and oxygen barrier layer and scattering outwardly through at least one of the lenses, and the scattered incident light passing through the protective panel and then reflected by a test object to generate a reflected light; the reflected light passing through the protective panel, entering at least one of the lenses and being converged; and the converged reflected light travels along a converged light path and passes through the water and oxygen barrier layer to be received by the light-sensing area and converted into an image electrical signal.

2. The full-screen display device according to claim 1, further comprising a light-absorbing layer disposed between the unit pixel defined as the sensing element and the water and oxygen barrier layer, and the light-absorbing layer defining a through hole, the light-sensing area being located below the through hole, and the light-absorbing layer not absorbing the emission wavelength defined by the unit pixel of the sensing element.

3. The full-screen display device according to claim 2, wherein the through hole is disposed on a converged light path of one of the lenses and is located at the center of the light-absorbing layer, and the light-sensing area is located at the center of the unit pixel defined as the sensing element.

4. The full-screen display device according to claim 1, wherein the unit pixels include a plurality of red light unit pixels, a plurality of blue light unit pixels, and a plurality of green light unit pixels; wherein, when the full-screen display device performs biometric recognition, the unit pixels defined as the light-emitting elements are the blue light unit pixels, the unit pixels defined as the sensing elements are the red light unit pixels, and the green light unit pixels are defined as inactive unit pixels.

5. The full-screen display device according to claim 1, wherein the unit pixels include a plurality of red light unit pixels, a plurality of blue light unit pixels, and a plurality of green light unit pixels; wherein, when the full-screen display device performs biometric recognition, the unit pixels defined as the light-emitting elements are the blue light unit pixels, the unit pixels defined as the sensing elements are the green light unit pixels, and the red light unit pixels are defined as inactive unit pixels.

6. The full-screen display device according to claim 1, wherein the unit pixels include a plurality of red light unit pixels, a plurality of blue light unit pixels, and a plurality of green light unit pixels; wherein, when the full-screen display device performs biometric recognition, the unit pixels defined as the light-emitting elements are the green light unit pixels, the unit pixels defined as the sensing elements are the red light unit pixels, and the blue light unit pixels are defined as inactive unit pixels.

7. The full-screen display device according to claim 1, further comprising an organic light-emitting diode, disposed on or below a second surface of the water and oxygen barrier layer and comprising the plurality of unit pixels.

\* \* \* \* \*